United States Patent [19]
Webb

[11] Patent Number: 5,398,976
[45] Date of Patent: Mar. 21, 1995

[54] CONNECTING DEVICE FOR PIPE ASSEMBLIES

[75] Inventor: Michael C. Webb, Chester Springs, Pa.

[73] Assignee: Environ Products, Inc., Lionville, Pa.

[21] Appl. No.: 923,831

[22] Filed: Aug. 3, 1992

[51] Int. Cl.⁶ .................... F16L 43/00; F16L 21/00
[52] U.S. Cl. ........................... 285/93; 285/236; 285/177; 285/332.4; 285/337; 285/127
[58] Field of Search ................. 285/13, 93, 236, 235, 285/177, 332.4, 337, 127, 14, 133.1

[56] References Cited

U.S. PATENT DOCUMENTS

| | | | |
|---|---|---|---|
| 912,671 | 2/1909 | Griesser | 285/133.1 X |
| 2,345,044 | 3/1944 | Hall | 285/133.1 X |
| 3,061,665 | 10/1962 | Rugg et al. | 285/177 X |
| 3,860,268 | 1/1975 | Zeman | 285/14 |
| 3,958,425 | 5/1976 | Maroschak | 285/14 X |
| 4,870,856 | 10/1989 | Sharp | 73/40.5 R |
| 4,968,179 | 11/1990 | Frahm | 405/53 |
| 5,174,610 | 12/1992 | Svendsen et al. | 285/13 |

FOREIGN PATENT DOCUMENTS

| | | | |
|---|---|---|---|
| 551816 | 6/1932 | Germany | 285/14 |
| 12995 | of 1903 | United Kingdom | 285/236 |
| 535134 | 3/1941 | United Kingdom | 285/177 |
| 9004157 | 4/1990 | WIPO . | |
| 9007074 | 6/1990 | WIPO . | |
| 9317266 | 9/1993 | WIPO . | |

*Primary Examiner*—Randolph A. Reese
*Assistant Examiner*—Heather Chun Shackelford
*Attorney, Agent, or Firm*—Eugene E. Renz, Jr.

[57] ABSTRACT

A device for providing access to the interstitial region between an inner pipe and an outer pipe which coaxially define the region. The inner pipe has at least one terminal end extending from the outer pipe to leave a portion of the outer wall of the inner pipe exposed to thereby expose the interstitial region. A boot is provided for defining a chamber with a larger end snugly fitting the outer pipe and a small end snugly fitting on the exposed outer wall of the inner pipe. The boot has an access port communicating with the interior of the chamber to provide access to the interstitial region.

32 Claims, 7 Drawing Sheets

CONNECTING DEVICE FOR PIPE ASSEMBLIES

FIELD OF THE INVENTION

The present invention relates to pipe systems of the type used in environmentally safe underground piping systems. More particularly, the present invention relates to a device for use with piping system in which access is provided to the interstitial region between an inner pipe and a containment jacket or outer pipe.

BACKGROUND OF THE INVENTION

In recent years there has been an increased awareness that underground storage and distribution systems for hazardous fluids such as hydrocarbon fuels and a diversity of other chemicals need to be improved to prevent from leaking into the environment and potentially contaminating underground drinking water. Both public health and fire safety regulatory bodies have imposed strict guidelines and regulations on such systems to insure public safety.

Leaking underground storage tanks and their associated underground piping systems have become the focus of the Federal Environmental Protection Agency (EPA) to initiate federal and state legislation that would require an improved means of storage, distribution, leak detection and accounting for all stored fluids which are deemed to be hazardous. The EPA has conducted studies which show that underground piping failures are caused by poor installation practices. Corrosion and structural failure are responsible for most of the leaks reported.

In response to this public awareness and concern, equipment specifiers and manufacturers have developed improved piping systems in recent years to provide a greater degree of protection for the environment. Most of these improved piping systems provide a second barrier of protection around the primary fluid supply piping, commonly referred to as "secondary containment".

For purpose of this description, underground piping systems are defined as the means of transferring liquids from a buried underground storage tank, using the tank's electrically powered dispensing pump to a generally metered dispensing unit or dispenser, generally located above ground. An underground piping system which is secondarily contained by a larger diameter piping system is generally referred to as a double-wall piping system. The primary distribution pipe which is contained is commonly referred to as the supply pipe and the larger outer secondary containment pipe is commonly referred to as the containment jacket or pipe. Other secondary containment components such as surface access chambers that are installed around the tank's pump and underneath a dispenser, are commonly referred to as access sumps. These storage, transferring and dispensing systems are typically found at service stations which market gasoline and diesel fuel. These pipes are also known as double wall pipes.

Equipment manufacturers have in recent years introduced supply piping systems and/or secondary containment systems for these supply piping systems of various designs and material selections. The following double wall piping systems are considered to be prior art to the present invention.

A secondary contained underground piping system has been proposed which features a non-flexible fiberglass supply pipe system fully contained by a larger non-flexible fiberglass containment piping system.

Another secondary contained underground piping system features a non-flexible fiberglass or steel supply pipe fully contained by a combination of both a larger flexible and non-flexible polyethylene telescoping containment pipe. The telescoping containment pipe design permits the complete inspection of the supply pipe line during assembly and integrity testing.

Alternatively, one can employ a secondarily contained underground piping system which features a non-flexible fiberglass or steel supply pipe fully contained by a larger non-flexible polyethylene telescoping containment pipe. The containment components of these systems are generally joined by means of metal fasteners and flexible seals. Yet another secondarily contained underground piping system features a fiberglass or steel non-flexible supply pipe partially contained by a flexible membrane piping trench liner.

Other systems include a secondarily contained underground piping system which features a fiberglass steel non-flexible supply pipe partially contained by a non-flexible fiberglass trench liner or one which features a flexible nylon composite supply pipe fully contained by a larger flexible polyethylene containment pipe.

It has also been proposed to have a secondarily contained underground piping system which features a flexible rubber composite supply pipe fully contained by a larger flexible polyurethane composite containment pipe. The flexible supply pipe is made of a rubber or elastomeric material for flexibility and requires metallic couplings installed on each end of a pipe section for attachment to a metallic short bend radius tee or elbow supply fitting. The flexible containment pipe is a thick wall tube which provides structural strength but limited flexibility.

The introduction of continuous flexible supply pipe a number of years ago was a means of reducing the amount of connection joints in the supply pipe compared to the commonly used steel and fiberglass non-flexible supply piping systems. The first flexible supply pipe which was introduced was a non-contained thin walled flexible copper tubing which was directionally bent to accommodate the routing required to connect the tanks pump to the various dispenser. The second flexible supply piping system was introduced in Europe, which was a direct burial or non-contained flexible polyethylene tubing which had thick wall and offered only a limited amount of flexibility. Both of these flexible supply piping systems did not require the use of access sumps. The third flexible supply piping was introduced several years ago and was secondarily contained a flexible containment pipe inside and did require the use of access sumps.

Some notable advantages of flexible double wall piping systems include considerably fewer piping joints than conventional double wall piping systems and also provide the unique feature of removing the supply pipe, in the event of a problem, without the need for excavation. These systems feature continuous lengths of both flexible supply pipe and flexible containment pipe which are made available in rolls of very long lengths. From these long lengths, pipe sections may be custom cut to length for installation between two or more surface access sumps. This feature eliminates the need for any directional fittings in the flexible containment pipe line, thus eliminating the need of any piping joints between the interconnected access sumps. The flexible primary piping does require the use of directional fittings but these fittings are located within the surface access sumps where they are surface accessible for inspection and maintenance. This piping design permits complete access to and observation of all the primary and secondary piping joints from the ground surface without the need for excavation.

There are also some notable disadvantages of both of these flexible double wall piping systems. Thin walled corrugated flexible containment pipe is easy to damage and difficult to repair. The inner corrugations restrict fluid migration from the source of the leak to the collection sump. The thin polyethylene material will not meet the Underwriters Laboratory standards for secondary containment. Thick walled non-corrugated flexible containment pipe requires the use of a soft elastomeric material in order to achieve limited flexibility. It is also questionable as to whether or not this material will meet the UL standard for secondary containment. Inner corrugated flexible supply pipe provides good flexibility but poor hydraulic flow efficiency and a low maximum operating pressure. The internal corrugations cause the pipe to be pressure expandable, which can produce faulty readings for in-line leak detection devices and make it difficult to connect internally expanded coupling devices, which could result in a leak. Thick walled flexible rubber supply pipe is heavy and has a highly resistive outer surface which makes it difficult to install into the flexible containment pipe. Rubber material is an unsatisfactory material to use as a supply pipe and will not likely meet the UL standard for primary containment.

All of the secondary contained piping systems and access sumps discussed above have developed over a relatively short period of time in response to the continuously changing environmental and safety regulations.

Shown in my co-pending application entitled Environmentally Safe Underground Piping Systems, filed Mar. 25, 1992 and bearing Ser. No. 07/857,361, is a double wall piping system that consists of a secondarily contained underground piping system. That system includes a flexible coaxial pipe in which the inner primary supply pipe is integral with the outer secondary containment jacket or pipe. This coaxial construction permits this dual purpose pipe to provide the means of both primary liquid supply and secondary containment within the same pipe. The double wall pipe has an interstitial space between the outer surface of the inner pipe and the inner surface of the outer pipe.

One of the more important features of the piping system described in my co-pending application is the interstitial space between the inner pipe and the outer pipe. This space primarily serves as a secondary containment area, so that leakage from the primary pipe or inner pipe will be contained by the secondary containment jacket or outer pipe. It would be of particular advantage in the art if the space between the two pipes could be used for testing and monitoring the condition of the inner pipe. Accordingly, an object of the present invention is to provide a method and apparatus for testing of the integrity of the inner pipe of a coaxial pipe system.

Similarly, it would be of great advantage if that interstitial space could also be used to test the integrity of the outer jacket or containment pipe. That is an additional object of the invention.

In piping systems which include many segments or sections of pipe, it is necessary to connect these sections in a leakproof manner. One of the difficulties in making these connections is that of providing a connection between the interstitial space of the piping system. It is relatively straightforward to connect the inner pipe using conventional connecting devices and seals. Connecting interstitial regions is more difficult when the junction of the pipes being connected branches in several directions, such as when a tee junction is used to take part of the contents of the inner pipe to a dispenser pump while passing the remainder of the fluid onto the next station. If one can picture the need for a series of double wall pipes to run from a storage tank to a plurality of gas station pumps, it can be appreciated that the connection of the interstitial space is at best geometrically difficult. Accordingly, another object of the present invention is to provide a device for connecting the interstitial space of two coaxial pipes which have been joined to connect the inner pipes to each other.

Often times, the interstitial space is allowed to vent into a sump or other device used to contain the junctions which, of course, have the potential for leakage. Sensors are then placed in the individual sumps so that fluid expelling from the interstitial space will be detected and alarm signalling the presence of a leak will be sounded. However, this leads to additional expense since a separate sensor or alarm system must be provided for each connecting region or sump. Routine inspection to verify that the alarm system is in operation thereby require significant labor as each separate system must be inspected.

Accordingly, it is an object of this invention to provide a simple monitoring system for coaxial pipes which have been connected into a system of multiple pipes which requires only one monitoring unit.

Yet another object of this invention is to provide apparatus and a method for a simple and leak proof way to monitor a system with a plurality of pipe systems and stations.

Other objects will appear hereinafter.

SUMMARY OF THE INVENTION

It has now been discovered that the above and other objects of the present invention may be accomplished in the following manner. Specifically, a device has been discovered which is useful for providing access to the interstitial regions between an inner pipe and an outer jacket which together define that space. In one embodiment, the invention comprises a double wall pipe system in which at least two pipes having inner and outer pipes defining that interstitial space are connected together. Finally, the invention also includes a monitoring device for use with such double wall pipe systems to monitor the conditions existing in the interstitial space.

The double wall pipe for which the present invention is suited comprises an inner pipe and an outer pipe which define the interstitial region between them. It is to be appreciated that any double wall pipe which defines an interstitial region is within the scope of this invention. Coaxial pipes are the preferred double wall pipes. The inner pipe has at least one terminal end which extends from the outer pipe to leave a portion of the outer wall of the inner pipe exposed. This exposes the interstitial space at the junction between the outer pipe and the outer wall of the inner pipe.

Access to the interstitial space is accomplished by use of what is generically termed a "boot" and which is an important part of the present invention. The boot is constructed from elastomeric flexible material such as rubber or other elastomers and it defines a flexible cylinder or tube. The cylinder has a larger end which snugly fits the outer pipe and a smaller end which snugly fits on the exposed outer wall of the inner pipe. The transition from the larger end to the smaller end may be via a taper or by a step-like reduction in size. Clamps are provided to further tighten the fit between the inner surfaces of the boot to assure a fluid tight fit with the particular pipe to which it is attached. Since one end of the boot is snugly fit on the outer pipe and the other end is snugly fit on the outer surface or wall of the inner pipe, the exposed interstitial space is contained within the boot that defines an annular chamber which is in communication with the interstitial space. The boot further includes a radially extending access port communicating with the interior of the cylinder to provide access to the interstitial space. In a preferred embodiment, ribs or other protuberances may be formed on the interior wall of the flexible tapered cylinder to more precisely locate the terminal end of the outer pipe at the desired place near the center of the axis of the cylinder.

In a preferred embodiment, the invention comprises a coaxial pipe system in which at least the two coaxial pipes having inner and outer pipes which are connected. In this system, each terminating end of the coaxial pipe is fitted with a boot as previously described. The inner pipes are connected in a conventional manner. The interstitial space defined by the coaxial pipes is also connected by including a connecting tube attached to the access port of two adjoining boots. This provides for a number of advantages which will be described hereinafter but which can be summarized as providing a capability for testing and monitoring the integrity of the system, and specifically that of both the inner or primary pipe and the outer containment jacket.

Toward that end, the invention further includes a monitoring device for use with underground pipe systems. When all of the piping has been connected in series using the boot of this invention, a sensor tube is connected to one end of this series connection of pipes. A quantity of liquid is placed in the interstitial space of the entire piping system. A sensor is then positioned to locate the level of liquid in the system with respect to a fixed point, most often located near the primary pump for the system. A sensor is provided for detecting changes in the level of the liquid with respect to the fixed point, so that an alarm can be sounded if the amount of fluid in the pipe increases or decreases, indicating leakage in one or both of the pipes.

BRIEF DESCRIPTION OF THE DRAWINGS

The objects of the present invention and the various features and details of the operation and construction thereof are hereinafter more fully set forth with reference to the accompanying drawings, where.

DETAILED DESCRIPTION OF THE INVENTION

Figure 10:
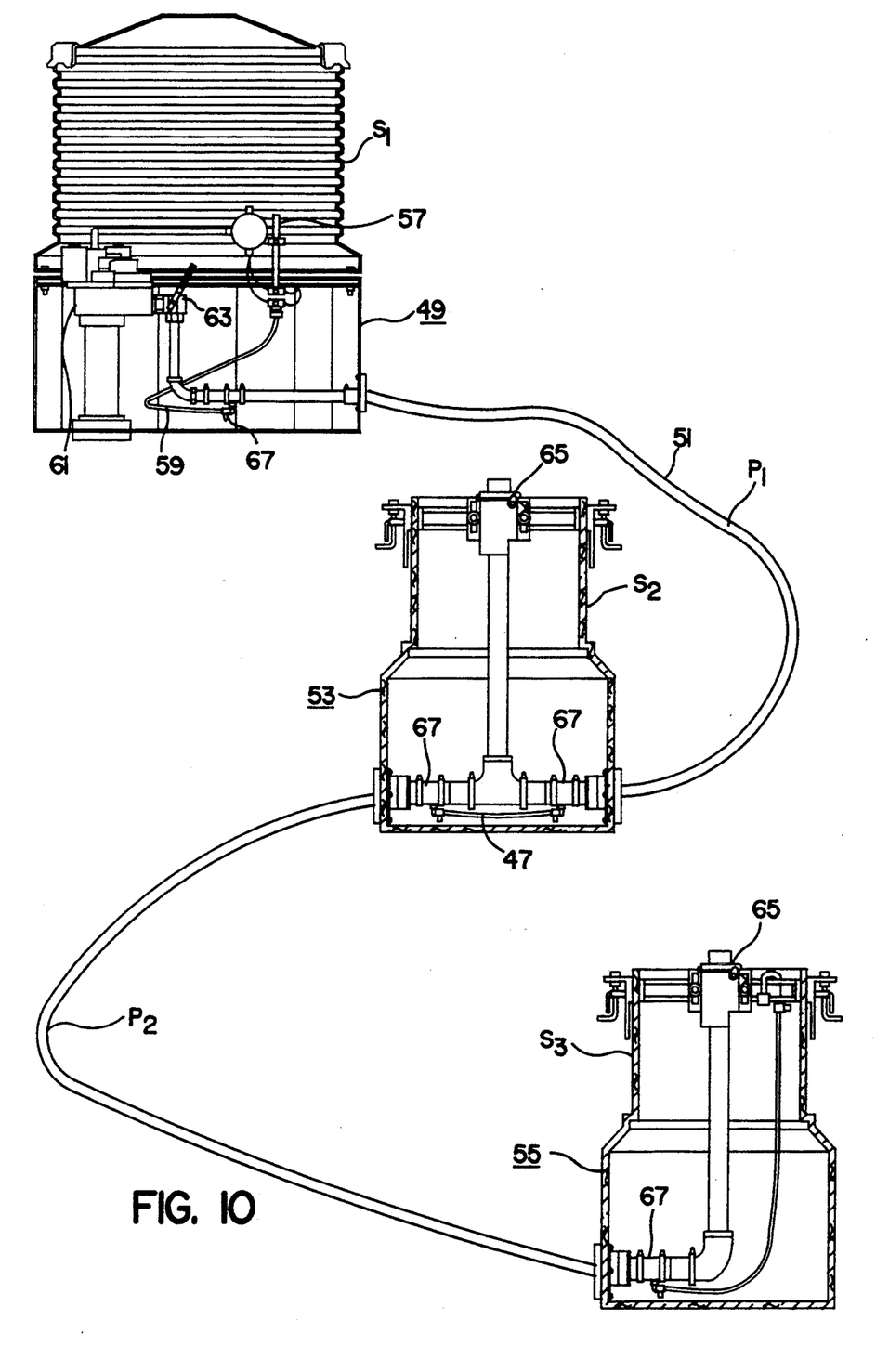
FIG. 10 shows the connecting and leakage sensing system of the present invention in a typical installation including a series of spaced sumps each having a pump take off or the like from the primary pipe of the piping system.

The present invention relates to a system and apparatus for monitoring leakage in flexible piping systems used underground for transporting petroleum products from a storage location or tank to a series of underground pumping stations $S_1$, $S_2$ and $S_3$ connected by piping sections $P_1$ and $P_2$ as illustrated schematically in FIG. 10. The flexible pipe sections each comprise an inner tubular member or primary pipe 35 for the product and an outer protective pipe 37 referred to as a containment pipe spaced from the inner primary pipe to define an interstitial space between the pipes.

Figures 7, 8, 9:
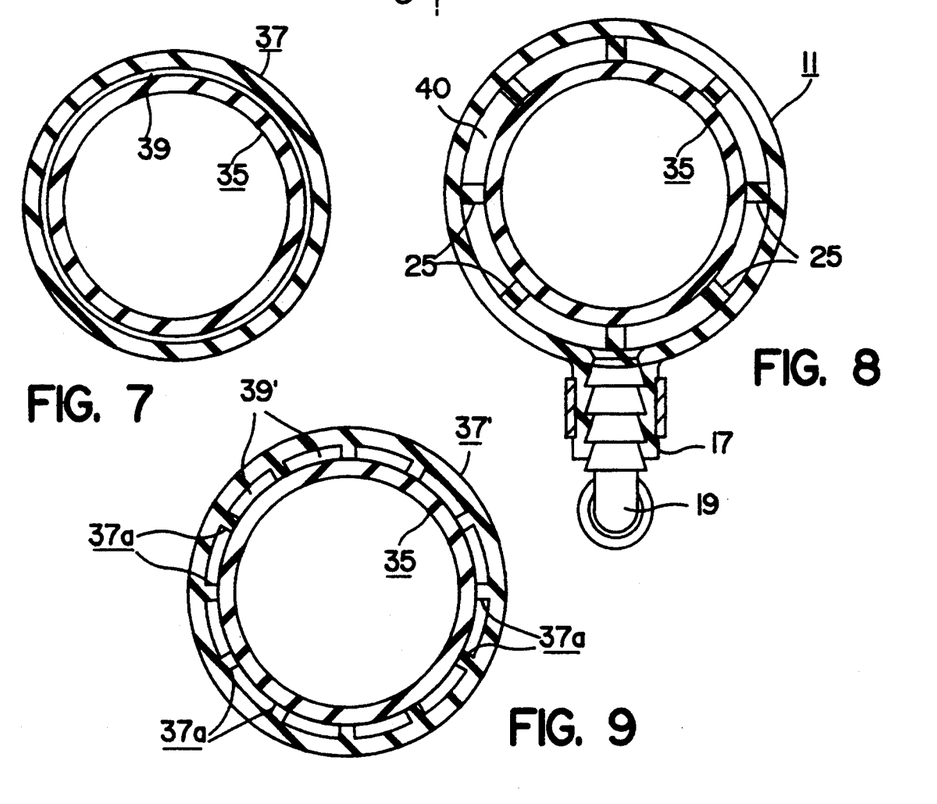
FIGS. 7 and 8 are sectional views taken on line 7—7 and 8—8 respectively of FIG. 6.
FIG. 9 is a cross-sectional view of another form of pipe assembly comprising of inner an outer tubular members having an interstitial space in the annular space between the members.

FIGS. 7 and 9 show pipe assemblies generally of this description wherein the pipes are coaxial and in one instance the interstitial spaces 39' are defined by circumferentially spaced, longitudinally extending ribs 37a which extend inwardly from the outer pipe 37 and engage the outer surface of the primary pipe 35. More specifically the present invention provides a boot device interconnecting the interstitial spaces of pipe sections in the piping system. The invention also contemplates a monitoring or sensing system for detecting leakage in the primary and containment pipes.

Figure 1:
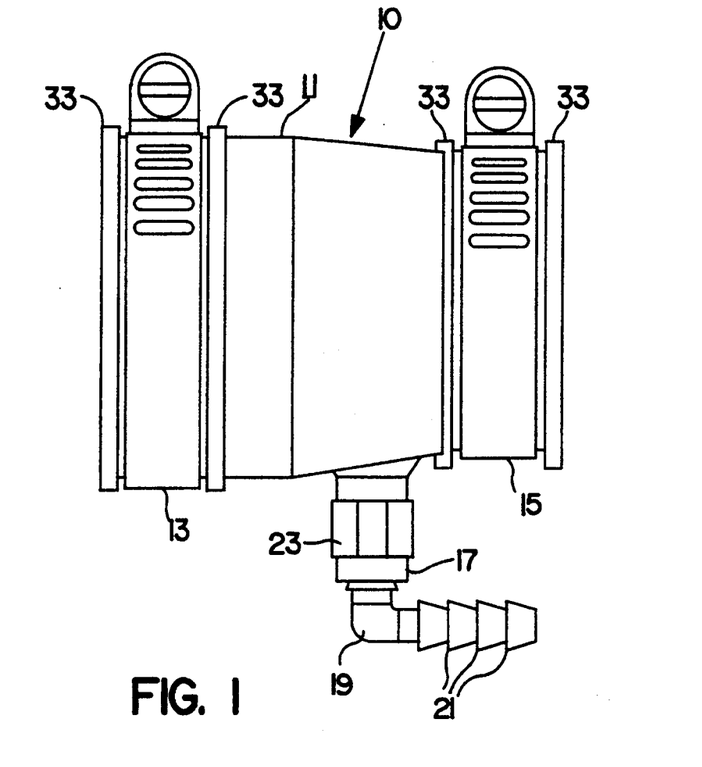
FIG. 1 is a side elevational view of the device of this invention.

The device of the present invention is shown generally in FIG. 1 by the reference numeral 10. The device includes a boot or cylinder 11, manufactured from an elastomeric material such as rubber. One particularly successful formulation is a 60 durometer hardness Buna-n rubber with anti-fungal and anti-ozonant agents.

The boot 11 is fastened to a piping system, described below, by clamps 13 and 15. Depending from the cylinder 11 is an access port, shown as a radially extending access port 17 which is fitted with an elbow fitting 19 having barbs 21 to facilitate attachment to tubes. The elbow fitting 19 is fastened to the access port 17 by clamp 23.

Figure 2:
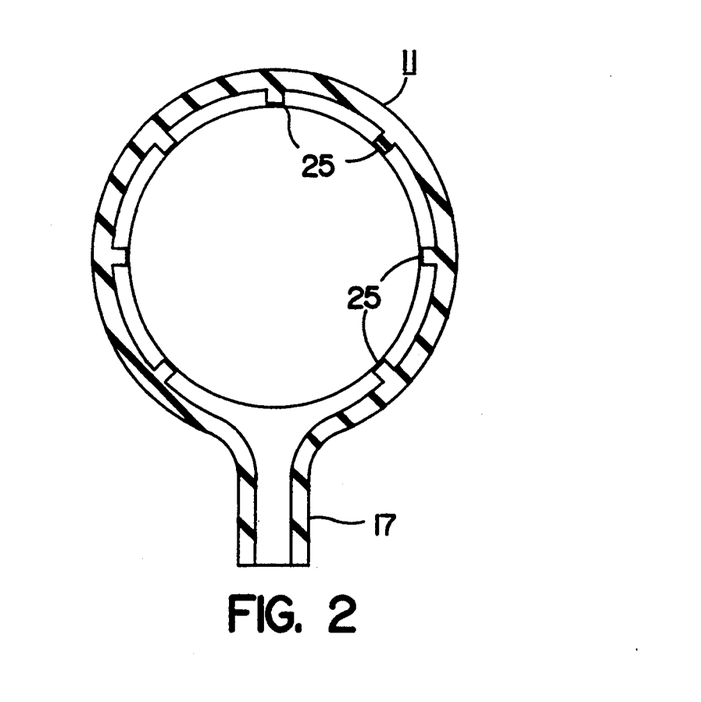
FIG. 2 is an schematic transverse sectional view taken on the line 2, 2 of FIG. 1.
Figure 3:
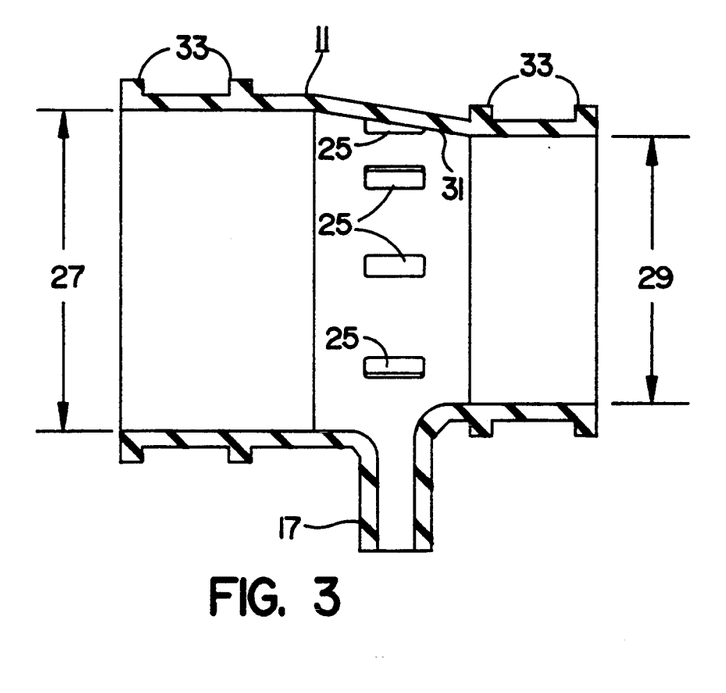
FIG. 3 is a schematic sectional elevational view taken on the line 3, 3 of FIG. 2.

FIGS. 2 and 3 show the boot or cylinder 11 of FIG. 1 in section views. Located in the central portion of the inside of boot 11 are a plurality of angularly spaced ribs 25 which function to locate the boot 11 at the proper position on the coaxial pipe for which it is intended. Ribs 25 present a surface which is transverse to the axis so that the larger or outer pipe will contact the ribs. As will be described later, the coaxial pipe includes an inner pipe which extends at its terminal end out from the terminal end of the outer pipe, leaving a junction so that rib 25 will abut against the terminal end of the larger or outer tube. The boot 11 has a larger end diameter 27 which is intended to snugly fit the outer pipe, and a smaller diameter 29 at the smaller end for snugly fitting on the exposed outer wall of the inner pipe. In the particular embodiment shown herein, the boot or cylinder 11 tapers at 31 from the large diameter 27 to the smaller diameter 29, leaving two cylindrical areas between annular ridges 33 for placement of the clamps 13 and 15. It would be also effective to have a continuous tapered cylinder from the largest diameter to the smallest, or, instead, to use a boot with a step-function change in diameter. Of primary importance is the need to have a fluid tight seal to the respective pipes.

Figure 4A:
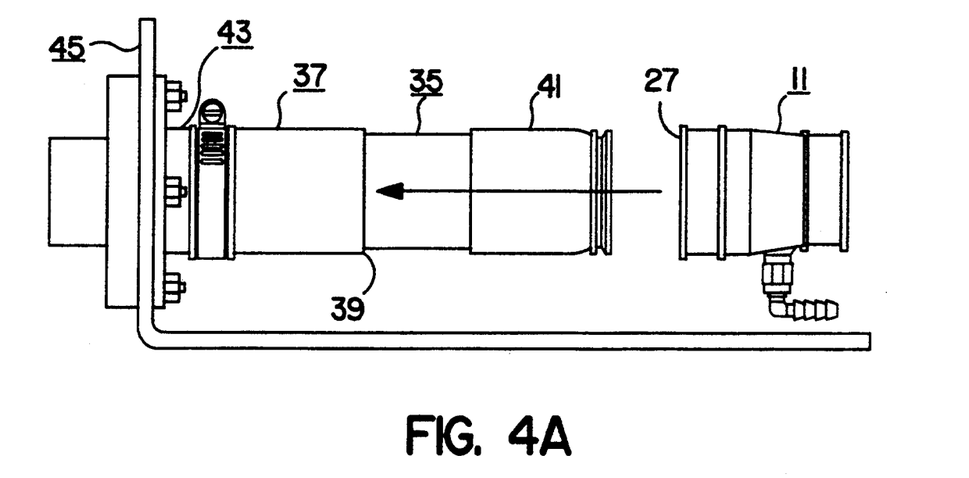
FIGS. 4A, 4B and 4C are a series of schematic views showing the sequential steps of installing the device of the present invention.
Figure 4B:
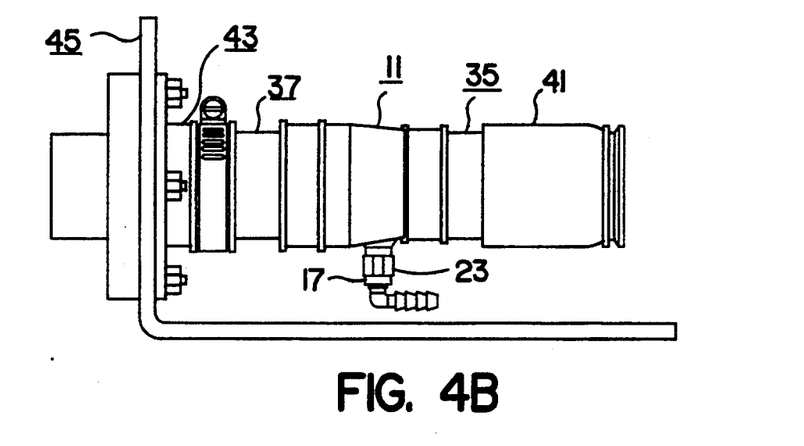
Figure 4C:
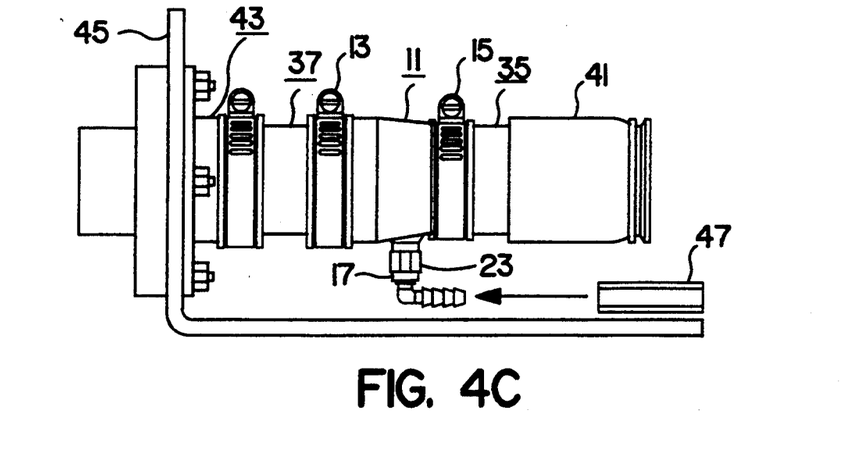

Turning now to FIGS. 4A, B, and C, installation of the boot 11 can be seen. The boot 11 is put onto a pipe assembly by inserting the large diameter end 27 in the direction shown by the arrow in FIG. 4A. The boot 11 passes over the inner pipe 35, which has been exposed by having the inner pipe 35 extend its terminal end out from the terminal end of the outer pipe 37 to expose the interstitial region 39 formed by the inner pipe 35 and the outer pipe 37. Boot 11 is passed over the inner pipe 35 and the inner pipe coupling 41, of conventional design, until the ribs 25, previously described in FIG. 3, intersect the edge of the interstitial region 39 so that the boot 11 covers both the outer pipe 37 and the inner pipe 35 as shown in FIG. 4B. The assembly is then complete as shown in FIG. 4C by addition of clamps 13 and 15. Also shown in FIG. 4A through 4C is the extension of the coaxial pipe consisting of inner pipe 35 and outer pipe 37 through an entry boot 43 which is fastened to the wall of a sump 45 or other permanent structure.

Figure 5:
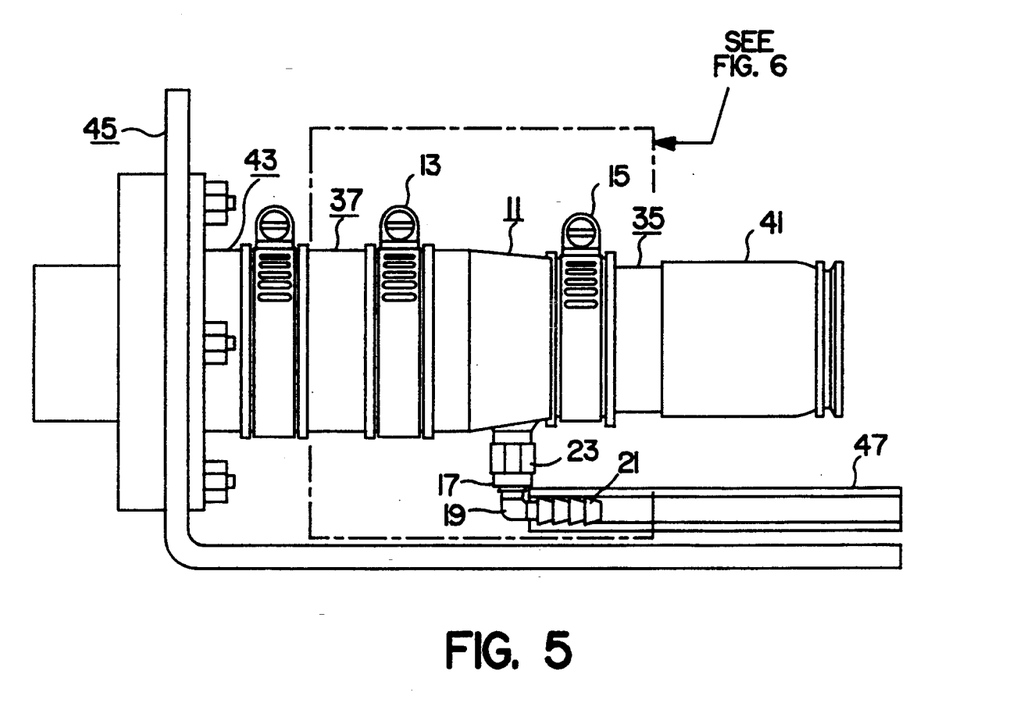
FIG. 5 is a side elevational view of the system of this invention shown in use with a single coaxial pipe.
Figure 6:
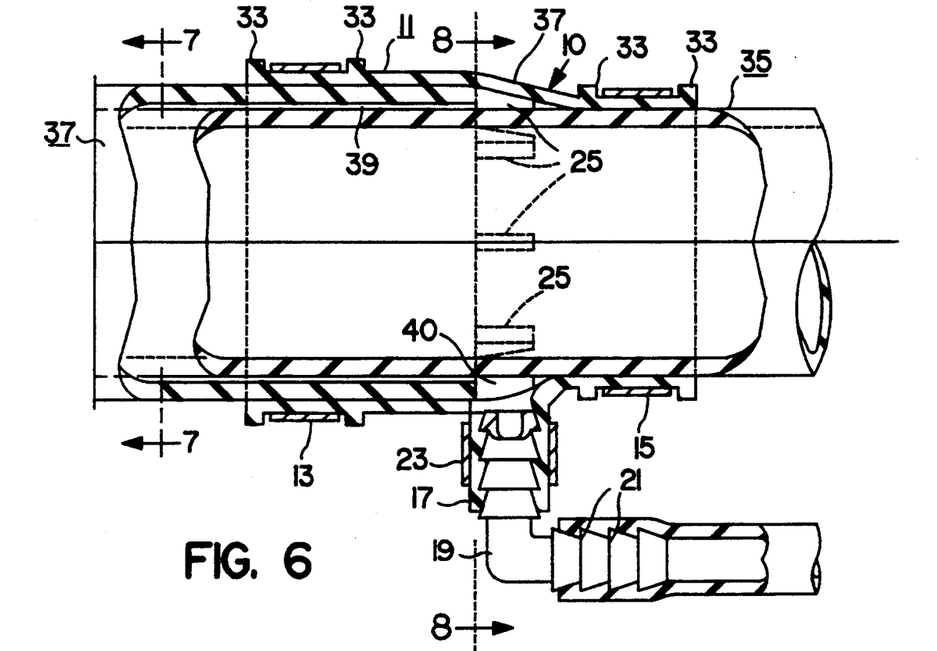
FIG. 6 is an enlargement of the detail contained within the dot R dash outline of FIG. 5 and designated FIG. 6 showing the connecting boot portions of the inner and outer coaxial pipes in section.

The assembly shown in FIG. 5 illustrates the preferred embodiment of the boot of the present invention. The boot 11 allows the inner pipe 35 to be connected via inner pipe coupling 41 to a source of fluid or to another similar coaxial pipe, or possibly to a terminating unit or dispensing unit as desired. Tubing 47 is forced onto barbs 21 of the fitting elbow 19 as previously described. In this embodiment, tube 47 is in direct communication with the interstitial region 39 while the inner pipe 35 remains intact and undisturbed. Accordingly, pressure or vacuum can be applied to tube 47 to test the integrity of the inner pipe 35. In addition, the outer pipe 37, which serves as a containment jacket in many instances, can be soaped or otherwise coated with a liquid solution which, upon application of air pressure through tube 47 to the interstitial region 39, will show any loss of integrity of the outer pipe 37. Thus, it is easy to test the integrity of each segment of piping in the system installed.

More specific details of the boot and pipe arrangement of FIG. 5 are shown in FIGS. 6 to 9. The boot 11 is located in its precise relationship to the pipes 35 and 37 by the intersection of ribs 25 and the terminal and of outer pipe 37. This permits direct communication with the interstitial space 39 between pipes 35 and 37. Boot 11 defines an annular chamber 40 between the ends of the boot. The interstitial space 39 is defined by pipes 35 and 37, as seen in FIG. 7. FIG. 8 illustrates the manner in which chamber 40 communicates with the access port 17 which in turn allows for communication with the interstitial space 39 in FIG. 7.

FIG. 9 illustrates one form of a coaxial pipe in which the interstitial space 39 is formed by ribs 37a formed on the inner surface of outer pipe 37.

Turning now to FIG. 10, the system of the present invention is shown in use in a larger system of fluid transfer. An originating tank sump 49 encloses the pumps and equipment which supplies fuel or other fluids through a flexible coaxial pipe 51 from a storage facility not shown. The fluid passes through one or more junction dispenser sumps 53 and terminates in a terminating dispenser sump 55. Fluid is taken from the reservoir or other storage facility by pump 61 and flow is regulated by valve 63. Fluid such as gasoline or fuel is then dispensed through dispensing units 65 which are associated with junction dispenser sump 53 and terminating dispenser sump 55. As noted, connecting boots 11 allow the inner pipes to pass into and out of various fixtures such as valve 63 and the T-junction and elbow junctions associated with dispensers 65 in the junction sump 53 and terminating sump 55 respectively.

Figure 11:
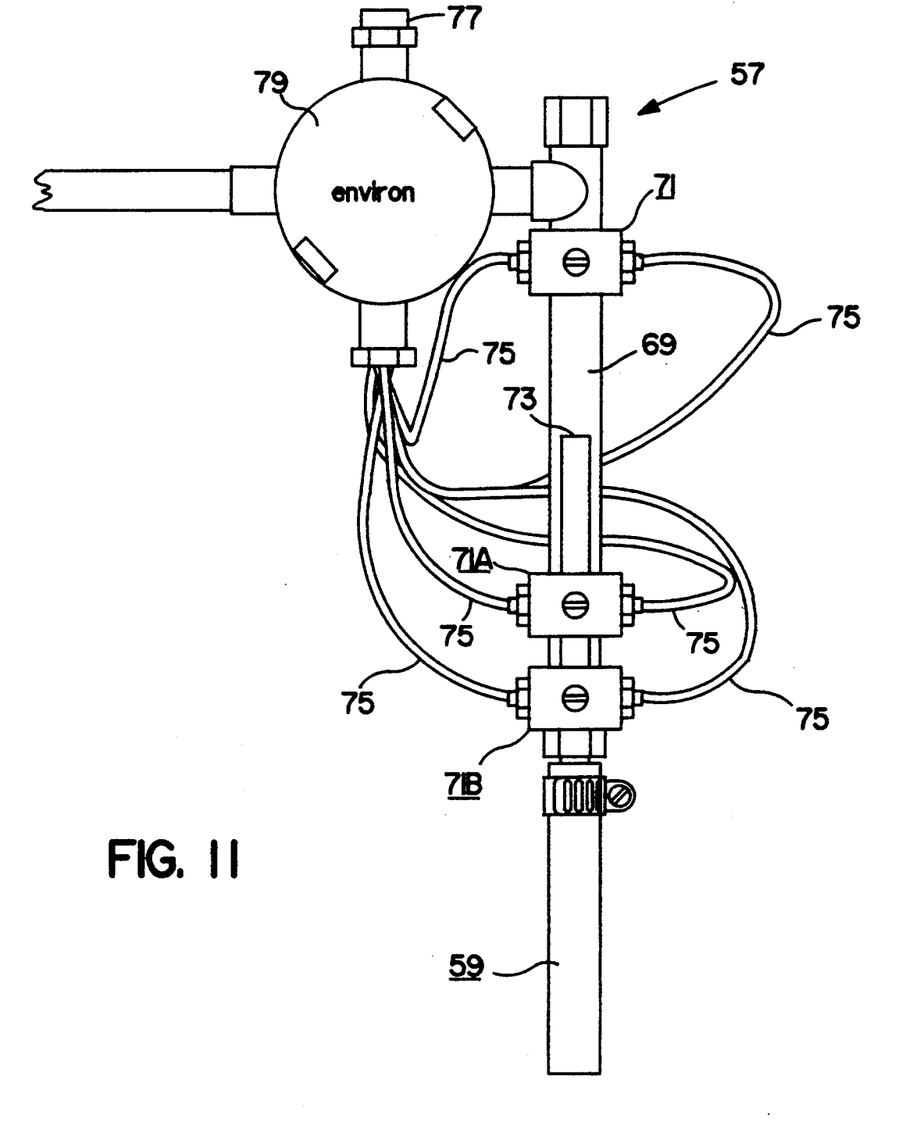
FIG. 11 is a view showing the leakage monitoring test assembly.

The integrity of the primary pipe and the containment jacket is tested by applying pressure or vacuum to the pipe system via tube 59, as previously described. Test assembly 57 also includes an alarm system and level sensing system such as that as shown in FIG. 11. Tube 59 extends vertically to orient an observation tube 69 with respect to a fixed point in space, after tube 59 has been filled with a liquid such as a non-toxic antifreeze. The liquid is filled to a point where the liquid level is between a plurality of sensors 71 so that the liquid 73 is visible in the observation tube 69. Sensors 71 are connected by fiber optic cables 75. An indicator light 77 is attached to electrical box 79 which contains all of the conventional processing equipment as well as the alarm and shut down circuitry.

In its normal operating steady state, the device shown in FIG. 11 is filled with sufficient liquid 73 such that the level of liquid 73 is positioned in the observation tube 69 between all of the sensors 71. If the primary tube begins to leak fluid for whatever reason, whether rupture or aging cracks or other factors, the fluid level 73 will rise to a point where it intersects the upper sensor 71. The alarm will sound and the pump 61 will be shut off. If, on the other hand, there is a slow loss of fluid 73 through evaporation or inspection or the like, the level 73 will drop below the middle sensor 71A. A signal will then be generated in the same way, but the system will not be shut down. This signal generated by sensor 71A indicates to the supervisory personnel that the level 73 is decreasing slowly. If, on the other hand, the level drops below sensor 71B, which would be the case if a rapid leak was taking place, an alarm and system shut-down would take place to prevent further leakage. Thus the alarm system serves as an indicator locating the general position and severity of the leak.

One skilled in the art would understand that the device can operate with the interstitial region filled with a liquid or a gas. A variety of sensing systems can be used to detect the change in pressure within the interstitial space. In the preferred embodiment, the interstitial region is filled with a sensing fluid similar to liquid 73.

As can be seen the present invention is admirably suited for use with coaxial tubes and particularly with flexible coaxial tubes where the inner and outer tube define an interstitial region. It is possible to monitor the integrity of the entire system due to the fact that different sections of coaxial piping can be connected not only through their inner pipe but also through the interstitial regions between the inner and outer pipe. This ability to connect the interstitial regions of all of the pipes to one system provides many advantages, such as those illustrated above.

While particular embodiments of the present invention have been illustrated and described, it is not intended to limit the invention, except as defined by the following claims.

What is claimed is:

1. A pipe system in which at least two double wall pipes define an interstitial region therebetween are connected, comprising:

inner pipe connector means connecting the respective inner pipes of said two coaxial pipes, at least one of said inner pipes having its connected terminal end extending from its outer pipe to leave a portion of the outer wall of said inner pipe exposed to thereby expose said interstitial region; and boot means for defining a chamber with a larger end snugly fitting said outer pipe and a smaller end snugly fitting said exposed outer wall of said inner pipe, said boot means having an access port communicating with the interior of said chamber to provide access to said interstitial region.

2. The device of claim 1, wherein both inner pipes have connecting terminal ends extending from their respective outer pipes to expose each of said interstitial region.

3. The device of claim 2, which further includes connector means for connecting the interstitial region of said connected pipes, said connecting means including tubing attached to the access ports of both of said boot means.

4. The pipe system of claim 3 further comprising a positioning means on the interior of the boot means for locating the access port relative to the end of the outer pipe.

5. The pipe system of claim 4 wherein the positioning means are a plurality of ribs.

6. The pipe system of claim 5 wherein the access port extends radially from the boot means and the ribs lie in a radial plane which intersects the access port, thereby locating the access port substantially adjacent to the end of the outer pipe and minimizing the blockage of the flow path from the interstitial region to the access port.

7. The pipe system of claim 6 wherein the ribs are circumferentially equally spaced about the interior of the boot means.

8. The piping system of claim 7 further comprising a clamp means for securing the larger end of the boot means to the outer pipe and the smaller end of the boot means to the exposed outer wall of the inner pipe.

9. The device of claim 8 further comprising a plurality of circumferential ridge regions on the outer side of the boot means for locating said clamp means.

10. In a coaxial pipe system formed from at least two double wall pipes having inner and outer pipes to define an interstitial region, a method of connecting the interstitial regions comprising the steps of:

connecting the respective inner pipes of said two coaxial pipes, said inner pipes having their connected terminal ends extending from its respective outer pipe to leave a portion of the outer wall of each inner pipe exposed to thereby expose said interstitial region;

placing a boot means having a chamber with its larger end snugly fitting said outer pipe and its smaller end snugly fitting said exposed outer wall of said inner pipe over each of said exposed interstitial regions said boot means having an access port communicating with the interior of said chamber to provide access to said interstitial region; and connecting said access ports to thereby connect said interstitial regions.

11. In a piping system having an inner pipe, an outer pipe and an interstitial region between the pipes forming part of the piping system, said inner pipe having at least one terminal end extending from the terminal end of said outer pipe to expose a portion of the outer wall of said inner pipe, the improvement comprising:

(a) boot means for defining a chamber, having a first end engaging said outer pipe and a second smaller end engaging said exposed outer wall of said inner pipe, said boot means including:

(b) an access port communicating with the interior of said chamber to provide access to said interstitial region; and (c) rib on the interior of said chamber for locating the boot means with respect to the terminal end of the outer pipe at a predetermined position with respect to the access port; and (d) first clamp means for tightening said first end of the boot means onto the outer wall of said outer pipe and second clamp means for tightening said smaller end of the boot means onto said outer wall of said inner pipe; and (e) said chamber including circumferential ridge regions on the chamber's outer side for locating said clamp means and a central tapered region.

12. A device for use in a piping system, the piping system having an inner pipe located inside a larger diameter outer pipe and defining an interstitial region between the inner and outer pipes, the inner pipe having at least one terminal end extending beyond a terminal end of the outer pipe to leave a portion of the outer wall of said inner pipe exposed allowing access to the interstitial region, the device comprising:

(a) a substantially frustum-shaped boot section, the base of the frustum section frictionally engaging the outer pipe and the top of the frustum section frictionally engaging the inner pipe thereby forming a sealed end to the interstitial region;

(b) an access port on the frustum section, communicating with the interstitial region to provide access to the interstitial region; and (c) positioning means on the interior of the frustum section for locating the access port at a predetermined position relative to the terminal end of the outer pipe; and (d) means for connecting said access port to an adjacent access port of a similar device.

13. In a two pipe assembly having inner and outer pipes spaced to define an interstitial space therebetween, the improvement comprising:

a boot sealed at one end to the outer pipe and sealed at the other end to the inner pipe and having an annular chamber between said ends communicating with said interstitial space; and an access port on the boot means for communicating with the annular chamber; and positioning means comprising a plurality of circumferentially spaced ribs in said annular chamber for locating the boot with respect to one end of the outer pipe.

14. In a piping system having an inner pipe, an outer pipe and an interstitial region between the pipes forming part of the piping system, said inner pipe having at least one terminal end extending from the terminal end of said outer pipe to expose a portion of the outer wall of said inner pipe, the improvement comprising:

boot means for defining a chamber, having a first end engaging said outer pipe and a second smaller end engaging said exposed outer wall of said inner pipe, said boot means including:

(a) an access port communicating with the interior of said chamber to provide access to said interstitial region; and (b) ribs on the interior of the chamber for locating the boot means with respect to the terminal end of the outer pipe, said ribs being located substantially coplanar with the access port, the plane being substantially perpendicular to the outer pipe, thereby allowing a substantially continuous flow path from the interstitial region to the access port.

15. The piping system of claim 14 wherein the ribs are circumferentially equally spaced about the interior of the chamber.

16. The piping system of claim 14 which includes means for connecting said access port to a monitoring system to monitor the interstitial region.

17. The piping system of claim 14 further comprising connection means for connecting the terminal end of a first inner pipe with the terminal end of a second inner pipe of the piping system; and a tube means for connecting the access port of a first boot means with the access port of a second boot means thereby allowing the continuous flow of materials in the inner pipes and in the interstitial region.

18. A device for use in a piping system, the piping system having an inner pipe located inside a larger diameter outer pipe and defining an interstitial region between the inner and outer pipes, the inner pipe having at least one terminal end extending beyond a terminal end of the outer pipe to leave a portion of the outer wall of said inner pipe exposed allowing access to the interstitial region, the device comprising:

a substantially frustum-shaped boot section, the base of the frustum section fictionally engaging the outer pipe and the top of the frustum section fictionally engaging the inner pipe thereby forming a sealed end to the interstitial region;

an access port on the frustum section, communicating with the interstitial region to provide access to the interstitial region; and positioning means on the interior of the frustum section for locating the access port at a predetermined position relative to the terminal end of the outer pipe; and connection means attached to the access port connecting to a monitoring system, thereby allowing the monitoring system to monitor the interstitial region.

19. The device of claim 18 wherein the positioning means are a plurality of ribs radiating inward.

20. The device of claim 18 wherein the ribs are located substantially coplanar with the access port, the plane being substantially perpendicular to the outer pipe, thereby locating the access port near the terminal end of the outer pipe and allowing a generally continuous flow path from the interstitial region to the access port.

21. A device for use in a piping system, the piping system having an inner pipe located inside a larger diameter outer pipe and defining an interstitial region between the inner and outer pipes, the inner pipe having at least one terminal end extending beyond a terminal end of the outer pipe to leave a portion of the outer wall of said inner pipe exposed allowing access to the interstitial region, the device comprising:

a substantially frustum-shaped boot section, the base of the frustum section frictionally engaging the outer pipe and the tope of the frustum section frictionally engaging the inner pipe thereby forming a sealed end to the interstitial region;

an access port on the frustum section, communicating with the interstitial region to provide access to the interstitial region; and positioning means on the interior of the frustum section for locating the access port at a predetermined position relative to the terminal end of the outer pipe; and clamp means for tightening the base and top of the frustum section to the outer and inner pipes respectively.

22. The device of claim 21 wherein the frustum section further comprises circumferential ridge sections on the outer side of the frustum section for locating the clamp means.

23. A connecting boot for accessing an interstitial region between an inner pipe and an outer pipe which form a part of a piping system, the boot comprising:

(a) an elongated tubular body portion having means for sealing the body to the inner and outer pipes at axially spaced locations;

(b) an access port in the body portion; and (c) rib means on the interior of the body portion adjacent to the access port for providing a continuous flow path from the interstitial region to the access port.

24. The boot of claim 23 wherein the ribs are circumferentially equally spaced about the interior of the body portion.

25. The boot of claim 23 further comprising clamp means for tightening said boot onto the outer pipe and the inner pipe.

26. The boot of claim 25 further comprising a plurality of circumferential ridge regions on the outer side of the body portion for locating said clamp means.

27. A boot for accessing an interstitial region in a substantially coaxial piping system having inner and outer pipes, the boot comprising:

an elongated tubular body portion having means for sealing the body to the inner and outer pipes at axially spaced locations;

an access port which extends from the body portion; and a plurality of projections means on the interior of the body portion adjacent the access port thereby allowing a continuous flow path from the interstitial region to the access port; and clamp means for tightening said boot onto the outer pipe and the inner pipe; and a plurality of circumferential ridge regions on the outer side of the body portion for locating said clamp means.

28. A boot for accessing an interstitial region in a substantially coaxial piping system having inner and outer pipes, the boot comprising:

an elongated tubular body portion having means for sealing the body to the inner and outer pipes at axially spaced locations;

an access port which extends from the body portion; and a plurality of projection means on the interior of the body portion adjacent the access port thereby allowing a continuous flow path from the interstitial region to the access port; and a connection means attached to the access port for connecting to a monitoring system, thereby allowing the monitoring system to monitor the interstitial region.

29. A device for use in a piping system, the piping system having an inner pipe located inside a larger diameter outer pipe and defining an interstitial region between the inner and outer pipes, the inner pipe having at least one terminal end extending beyond a terminal end of the outer pipe to leave a portion of the outer wall of said inner pipe exposed allowing access to the interstitial region, the device comprising:
- a substantially frustum-shaped boot section, the base of the frustum section frictionally engaging the outer pipe and the top of the frustum section frictionally engaging the inner pipe thereby forming a sealed end to the interstitial region;
- an access port on the frustum section, communicating with the interstitial region to provide access to the interstitial region; and
- positioning means on the interior of the frustum section for locating the access port at a predetermined position relative to the terminal end of the outer pipe.

30. A connecting boot for accessing an interstitial region between an inner pipe and an outer pipe which form a part of a piping system, the boot comprising:
 (a) an elongated tubular body portion having means for sealing the body to the inner and outer pipes at axially spaced locations;
 (b) an access port in the body portion; and
 (c) rib means on the interior of the body portion adjacent to the access port for providing a continuous flow path from the interstitial region to the access port.-

31. A device for use in a piping system, the piping system having an inner pipe located inside a larger diameter outer pipe and defining an interstitial region between the inner and outer pipes, the inner pipe having at least one terminal end extending beyond a terminal end of the outer pipe to leave a portion of the outer wall of said inner pipe exposed allowing access to the interstitial region, the device comprising:
- a substantially frustum-shaped boot section, the base of the frustum section frictionally engaging the outer pipe and the top of the frustum section frictionally engaging the inner pipe thereby forming a sealed end to the interstitial region;
- an access port on the frustum section, communicating with the interstitial region to provide access to the interstitial region;
- positioning means on the interior of the frustum section for locating the access port at a pre-determined position relative to the terminal end of the outer pipe comprising a plurality of ribs radiating inwardly located substantially coplanar with the access port, the plane being substantially perpendicular to the outer pipe, thereby locating the access port near the terminal end of the outer pipe and allowing a generally continuous flow path from the interstitial region to the access port.

32. A connecting boot for accessing an interstitial region between an inner pipe and an outer pipe which form a part of a piping system, the boot comprising:
 (a) an elongated tubular body portion having means for sealing the body to the inner and outer pipes at axially spaced locations;
 (b) an access port in the body portion; and
 (c) a plurality of rib members circumferentially equispaced about the interior of the body portion adjacent to the access port for providing a continuous flow path from the interstitial region to the access port.

* * * * *